(12) United States Patent
Lunacek et al.

(10) Patent No.: US 9,790,118 B2
(45) Date of Patent: Oct. 17, 2017

(54) VALVE ASSEMBLY FOR AN IS MACHINE

(71) Applicant: HEYE INTERNATIONAL GMBH, Obernkirchen (DE)

(72) Inventors: Matthias Lunacek, Obernkirchen (DE); Benedikt Felgenhauer, Herford (DE); Michael Winkler, Obernkirchen (DE); Dirk Winkelhake, Obernkirchen (DE); Kai Buschmann, Lindhorst (DE); Wilfried Seidensticker, Obernkirchen (DE); Markus Jochens, Rinteln (DE); Thomas Hartmann, Bückeburg (DE)

(73) Assignee: Heye International GMBH, Obernkirchen (DE)

( * ) Notice: Subject to any disclaimer, the term of this patent is extended or adjusted under 35 U.S.C. 154(b) by 0 days.

(21) Appl. No.: 14/911,841

(22) PCT Filed: Jul. 21, 2014

(86) PCT No.: PCT/EP2014/001975
§ 371 (c)(1),
(2) Date: Feb. 12, 2016

(87) PCT Pub. No.: WO2015/022046
PCT Pub. Date: Feb. 19, 2015

(65) Prior Publication Data
US 2016/0200619 A1    Jul. 14, 2016

(30) Foreign Application Priority Data

Aug. 12, 2013   (DE) .................. 10 2013 013 312

(51) Int. Cl.
*C03B 9/40*        (2006.01)
*F16K 31/60*       (2006.01)
(Continued)

(52) U.S. Cl.
CPC .............. *C03B 9/406* (2013.01); *F16K 31/02* (2013.01); *F16K 31/60* (2013.01); *F16K 35/00* (2013.01);
(Continued)

(58) Field of Classification Search
CPC ......... C03B 9/406; F16K 31/02; F16K 31/60; F16K 35/00; G06F 3/011; G06F 3/017
See application file for complete search history.

(56) References Cited

U.S. PATENT DOCUMENTS 2,946,347 A   7/1960   Ruhl
2,965,133 A   12/1960  Rice et al.
(Continued)

FOREIGN PATENT DOCUMENTS

DE   2238702 A1    2/1973
DE   69411436 T2   11/1998

*Primary Examiner* — Kevin Lee
(74) *Attorney, Agent, or Firm* — Fox Rothschild LLP

(57) ABSTRACT

A valve assembly (1) which is intended for differentiated individual control of the movement mechanisms of an IS machine and can therefore be used in a modular manner consists of a valve support (2') and a head part (22) which supports two pilot control valves (3, 5), two safety valves (4, 6) and two switching valves as one assembly. By way of actuation of the safety valves (4, 6), the feed of control air to the switching valves can be interrupted, which switching valves are assigned, for example, to the opening movement and the closing movement, respectively, of a closing cylinder which is assigned to a preform. The valve assembly has interfaces for connection of control and operating air and for electric connection to a machine controller. If required, the assembly which is designed in this way makes it possible to interrupt the control air in a differentiated way which is related to an individual track, in addition to simple assembly and dismantling.

22 Claims, 5 Drawing Sheets

(51) Int. Cl.
  *F16K 31/02* (2006.01)
  *F16K 35/00* (2006.01)
  *G06F 3/01* (2006.01)
  *G06F 3/03* (2006.01)
  *G06F 3/16* (2006.01)

(52) U.S. Cl.
  CPC .............. *G06F 3/011* (2013.01); *G06F 3/017* (2013.01); *G06F 3/0304* (2013.01); *G06F 3/167* (2013.01)

(56) References Cited

U.S. PATENT DOCUMENTS

| | | | |
|---|---|---|---|
| 3,737,296 A | 6/1973 | Faure et al. | |
| 4,382,451 A | 5/1983 | Lowe | |
| 5,505,758 A | 4/1996 | Greueninger | |
| 6,155,290 A | 12/2000 | Nakajima et al. | |
| 6,431,209 B1* | 8/2002 | Weiler, Jr. | C03B 9/406 137/596.1 |
| 6,758,241 B1* | 7/2004 | Pfund | F15B 20/001 137/596.16 |
| 8,740,316 B2* | 6/2014 | Schal | B60T 17/02 137/115.18 |
| 9,458,042 B2* | 10/2016 | Borcherding et al. | C03B 9/3816 |
| 2008/0078455 A1 | 4/2008 | Patterson | |

* cited by examiner

VALVE ASSEMBLY FOR AN IS MACHINE

FIELD OF THE INVENTION

The invention relates to a valve assembly for controlling a movement mechanism of an IS machine. The valve assembly has a pilot control valve for controlling the control air to a switching valve, the switching valve in turn controlling the pneumatic operating air for the movement mechanism. Both valves are included on a valve carrier allocated to the movement mechanism.

BACKGROUND OF THE INVENTION

Known from US 2008/0078455 A1 is a system to automatically shut down valves in an emergency situation, specifically to open or close line valves for oil or gas on a drilling platform. Here, spring force initiates a switching movement of a slide valve in a pipeline, requiring a considerable amount of energy for executing the switching process.

Known to the applicant is to pneumatically activate closing mechanisms of the preforms and finished forms of an IS machine, for example, by means of valve assemblies, which all are mounted on a valve block, which in turn is connected with a machine frame, with an adapter plate interspersed. Each valve assembly associated with an individual movement section of the machine, e.g., one for closing and opening a specific preform, is referred to as a track. Each of the valve assemblies consists of a cartridge carrier that holds two switching cartridges, each of which can be actuated by means of an optionally electrically or manually activatable pilot control valve. The pilot control valves set up to actuate switching valves formed by the switching cartridges control the movement of the respective form halves, wherein, if operating air is supplied separately via the adapter plate, safety valves are formed between the latter and an air distributor or, in the absence of a separate supply of operating air, by some other external valve. An interruption of control air for each track of the I.S. machine, i.e., one such interruption control confined to a single valve assembly, is here not provided, wherein furnishing additional tracks with mutually independent safety valves is associated with more space being required for their accommodation, and in many instances is very difficult if not impossible to realize due to space limitations.

A comparable problem exists in conjunction with controlling the other mechanisms of the valve assemblies allocated to the IS machine and also mounted on the valve block.

In light of the stricter legal requirements to be expected in the future as relates to work safety, it has become necessary to equip a larger number of valve assemblies with a safety valve, a requirement that is frequently virtually impossible to satisfy with conventional technology, in particular for space considerations.

However, a cascade consisting of an electrical signal that actuates the pilot control valve, which in turn actuates the switching valve and reaches the respective closing mechanism via an external safety valve, is undesirable from a control technology standpoint.

SUMMARY OF THE INVENTION

Therefore, the object of the invention is to configure a valve assembly of the kind described above, with respect to the valve assembly for each track, with a safety valve while preferably preserving a compact, space-saving design. This object is achieved in such a valve assembly wherein the valve carrier is also equipped with at least one safety valve arranged in the flow path of the control air between the pilot control valve and the switching valve. The safety valve includes of a shank arranged in a borehole of the valve carrier so that it can axially slide between a position representing an open position and a closed position. A respective switching valve is allocated to the opening and closing movement of the movement mechanism of the IS machine, and a respective switching position of the switching valve is secured by a spring force. The shank can include a knob for actuating the safety valve.

Essential to the invention according to the above is that a valve carrier, meaning an assembly that accommodates or incorporates at least a pilot control valve and a working valve, is configured to include a safety valve. This yields a modular valve assembly, which is characterized by a high level of integration, since all control and security functions relating to a movement mechanism are combined into one valve assembly. This enables a track-by-track fitting with safety valves, i.e., a safety valve with each track's valve assembly, as well, without additional space being required for this purpose on any relevant scale. In particular, existing IS machines can be easily retrofitted using these valve assemblies to satisfy future legal requirements relating to work safety without any greater outlay.

The safety valve integrated into the valve carrier consists of a shank that is slidably held in a borehole, wherein an open and closed position can be created via the displacement position of the shank within this borehole. In terms of the structural creation of these positions, a simple solution is offered by an axially limited annular space that is worked into the surface of the mentioned shank, and can be used in conjunction with lateral boreholes to easily create a continuous connection in terms of a closed or open position.

The safety valve is situated in the flow path of the control air between a pilot control valve and a switching valve. The respective last position of the switching valve, e.g., which is directly used for controlling the movement of the closing cylinder of a preform or finished form, remains unchanged in the absence of actuation. The boreholes required for guiding the flow of control air can be readily accommodated inside of the valve body.

A respective switching valve is allocated to the opening and closing movement of a movement mechanism of the IS machine, wherein the default switching position of each, i.e., the one established without the application of control air is secured by a spring force. Therefore, two switching valves are usually incorporated into a valve assembly, in particular into a valve carrier, e.g., one to open a preform and one to close the preform.

According to additional features of the invention, the valve carrier is equipped with interfaces for supplying and removing control air (by which the pilot control valve controls the switching valve) and operating air (by which the switching valve operates the movement mechanism of the IS machine), to which are added interfaces for electrical connection to a machine controller. In this way, the valve carrier can also be changed out as a unit as needed, e.g., as part of maintenance and repair procedures.

According to the features of another embodiment, each pilot control valve is optionally designed to be electrically or manually controllable. This provides a high level of operational flexibility.

According to the features of another embodiment, each switching valve consists of a replaceable switching cartridge arranged inside of the valve carrier, wherein a switching cartridge must be regarded as any functional unit that exhibits movable parts for creating a closed and open position, and hence can perform the function of a valve. Essential in this configuration is that the switching cartridge can be easily changed out in case of wear.

According to additional features, at least the open or closed position of each safety valve can be locked, making it possible in this respect to prevent switching processes that are unintended and could potentially pose an accident risk.

According to further features, the valve carrier consists of a cartridge carrier that exhibits a cylindrical space for accommodating the switching cartridge(s), and is sealed at the front face by a cover or head part. The head part is preferably also detachably connected with the cartridge carrier, and can simultaneously serve as a support for a pilot and safety valve. A modular assembly that encompasses all control and security functions is obtained in this case as well.

Still further features are geared toward other advantageous embodiments of both the safety valve and pilot control valve. As evident, the valve assembly according to the invention can be used to modularly equip all tracks of an IS machine, so that future legally prescribed standards can be met in each case.

BRIEF DESCRIPTION OF THE DRAWINGS

The invention will be described in greater detail below with reference to the exemplary embodiment schematically depicted in the attached drawings.

DETAILED DESCRIPTION OF A PREFERRED EMBODIMENT

Figure 1:
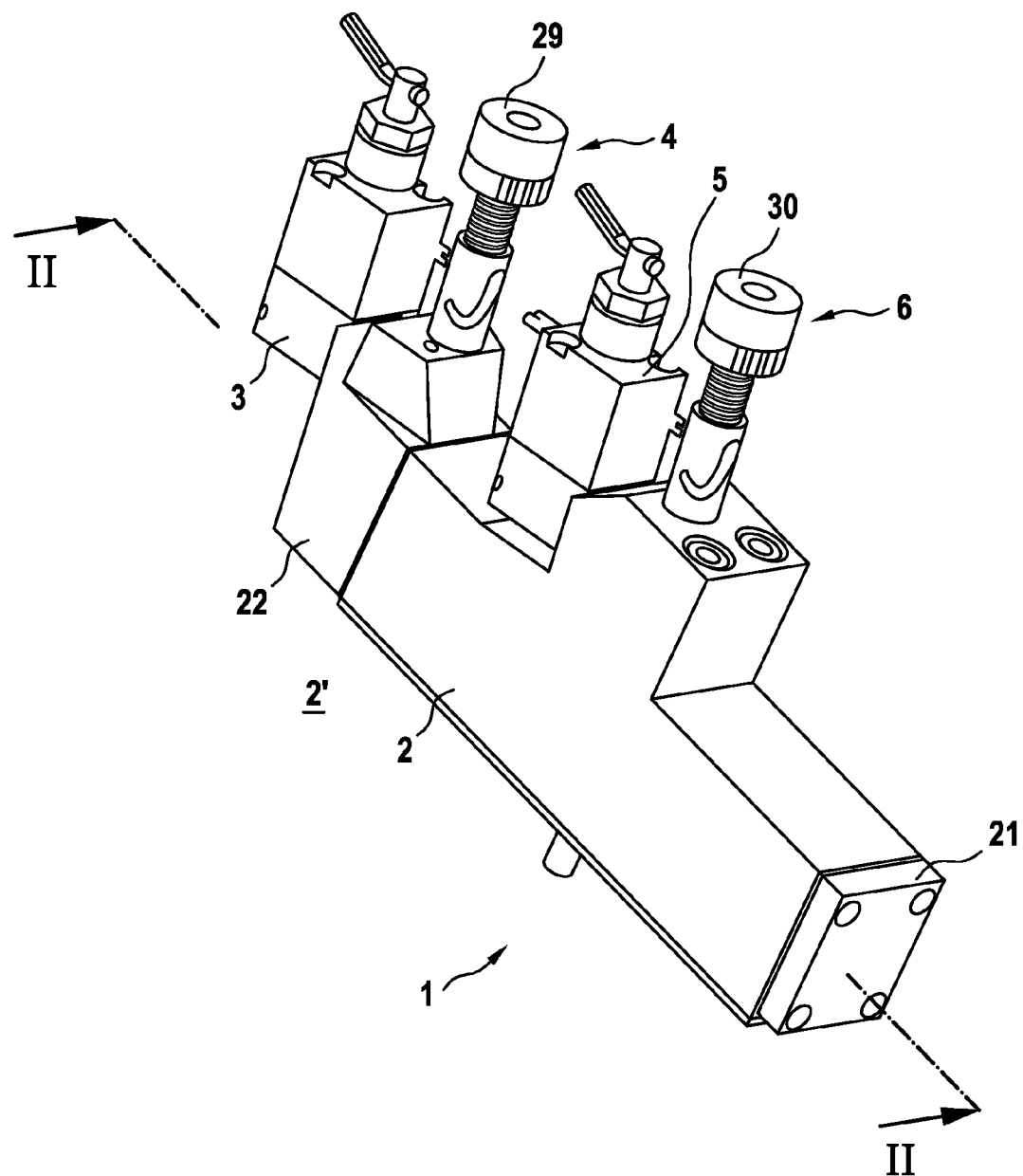
FIG. 1 is a perspective view of the valve assembly according to the invention.

FIG. 1 shows a valve assembly 1 in its entirety, which consists of a cartridge carrier 2 that holds an upper and lower switching cartridge, and together with a cover part 22 forms a modularly assembled valve carrier 2'. The valve carrier 2' carries a pilot control valve 3 together with a safety valve 4 allocated to an upper switching cartridge, as well as a pilot control valve 5 together with a safety valve 6 allocated to the lower switching cartridge. The function of the two switching cartridges remains to be explained below.

In a manner yet to be explained below, this valve assembly 1 is allocated to the movement mechanism (not graphically depicted) of the preform of an IS machine, and thus set up to control the opening and closing of the preform halves.

Figure 4:
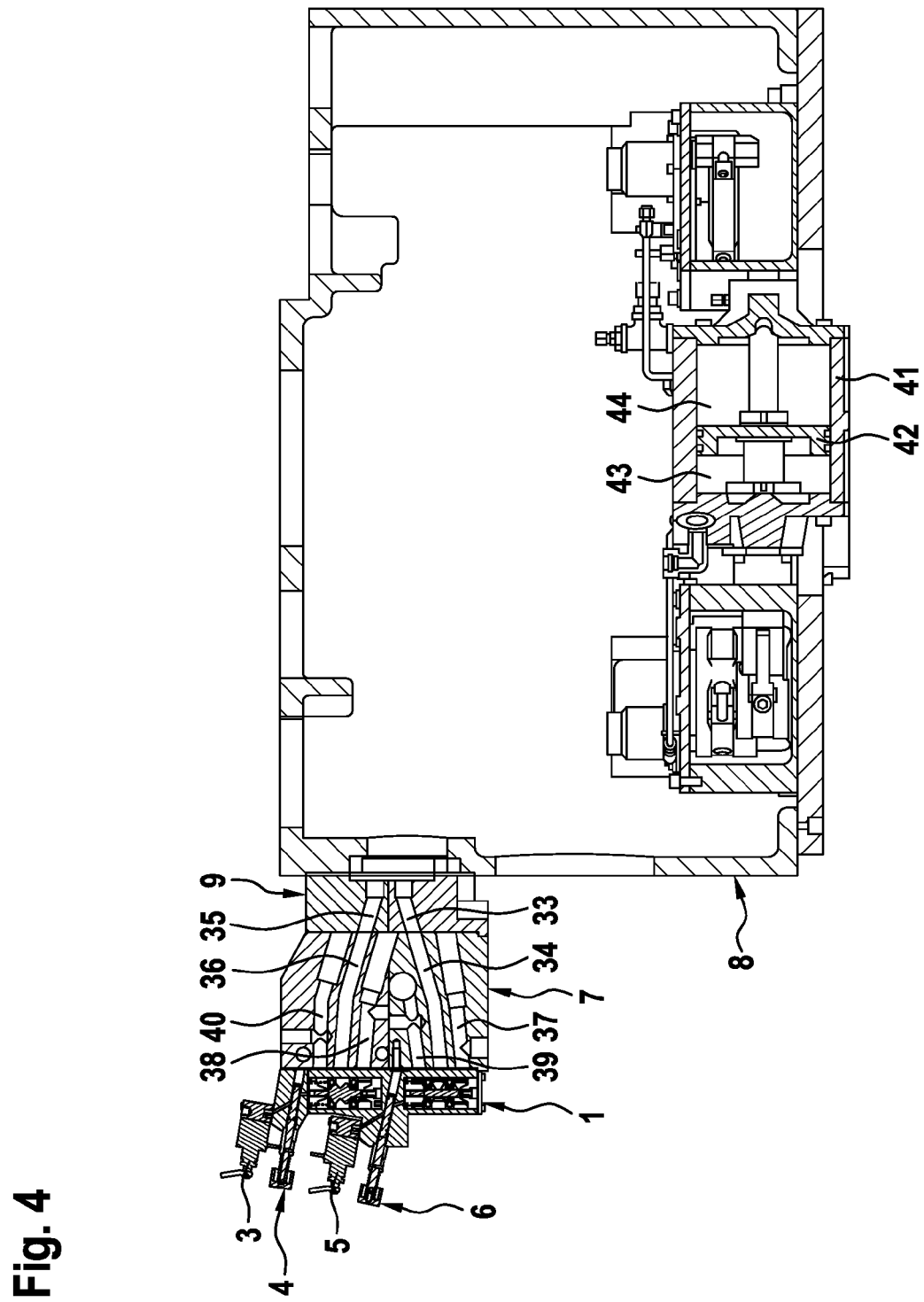
FIG. 4 is a vertical section depicting the assembly situation of the valve assembly according to FIG. 1.
Figure 5:
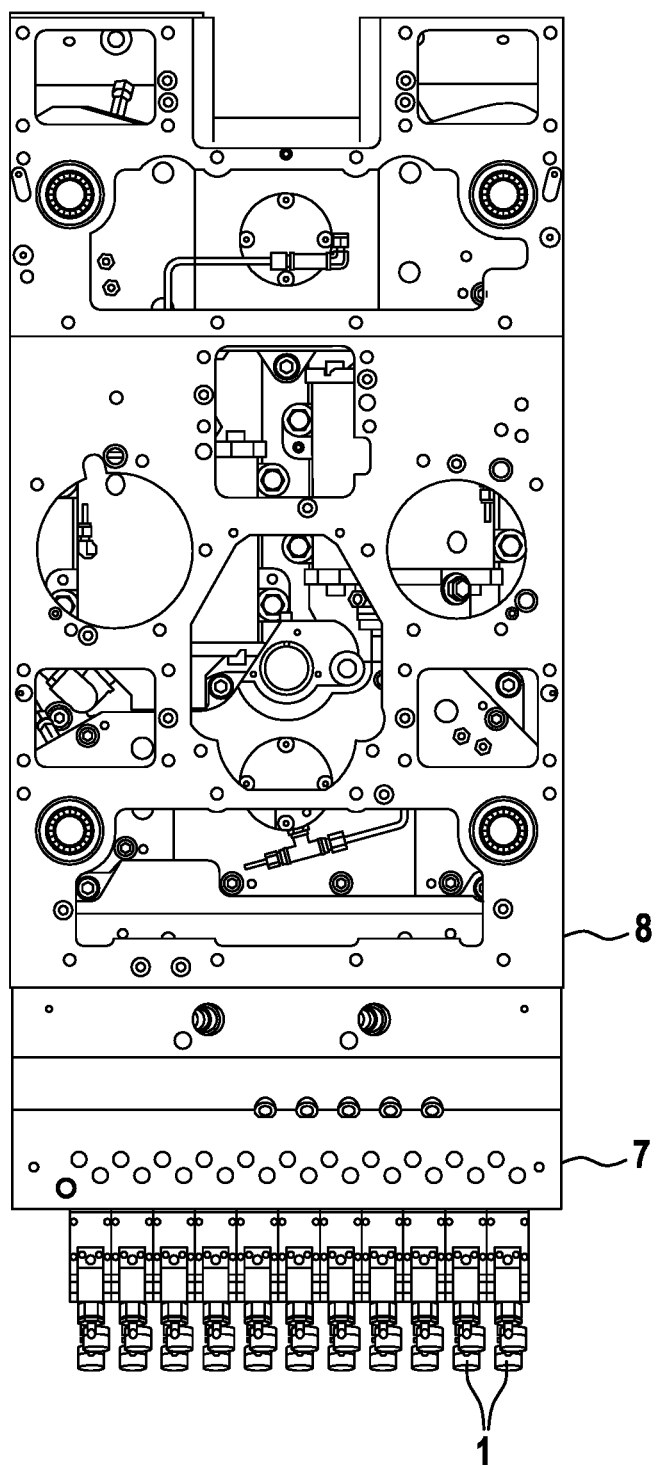
FIG. 5 is a partial horizontal section depicting the assembly situation of the valve groups according to FIG. 1.

As illustrated in detail on FIG. 4 and FIG. 5, the valve assembly 1 when mounted is connected by means of a valve block 7 with the machine frame 8 of the IS machine, which is set up for mounting a plurality of such valve assemblies 1, which are each meant to control a specific movement mechanism. An adapter plate 9 is located between the machine frame 8 and valve block 7.

In the following, reference will first be made to drawing FIGS. 2 and 3, which each show a valve assembly 1 with the safety valves 4, 6 in different switching positions.

Both pilot control valves 3, 5 can optionally be manually controlled with a hand lever 10, 11, or electrically controlled between an open and closed position.

Figure 2:
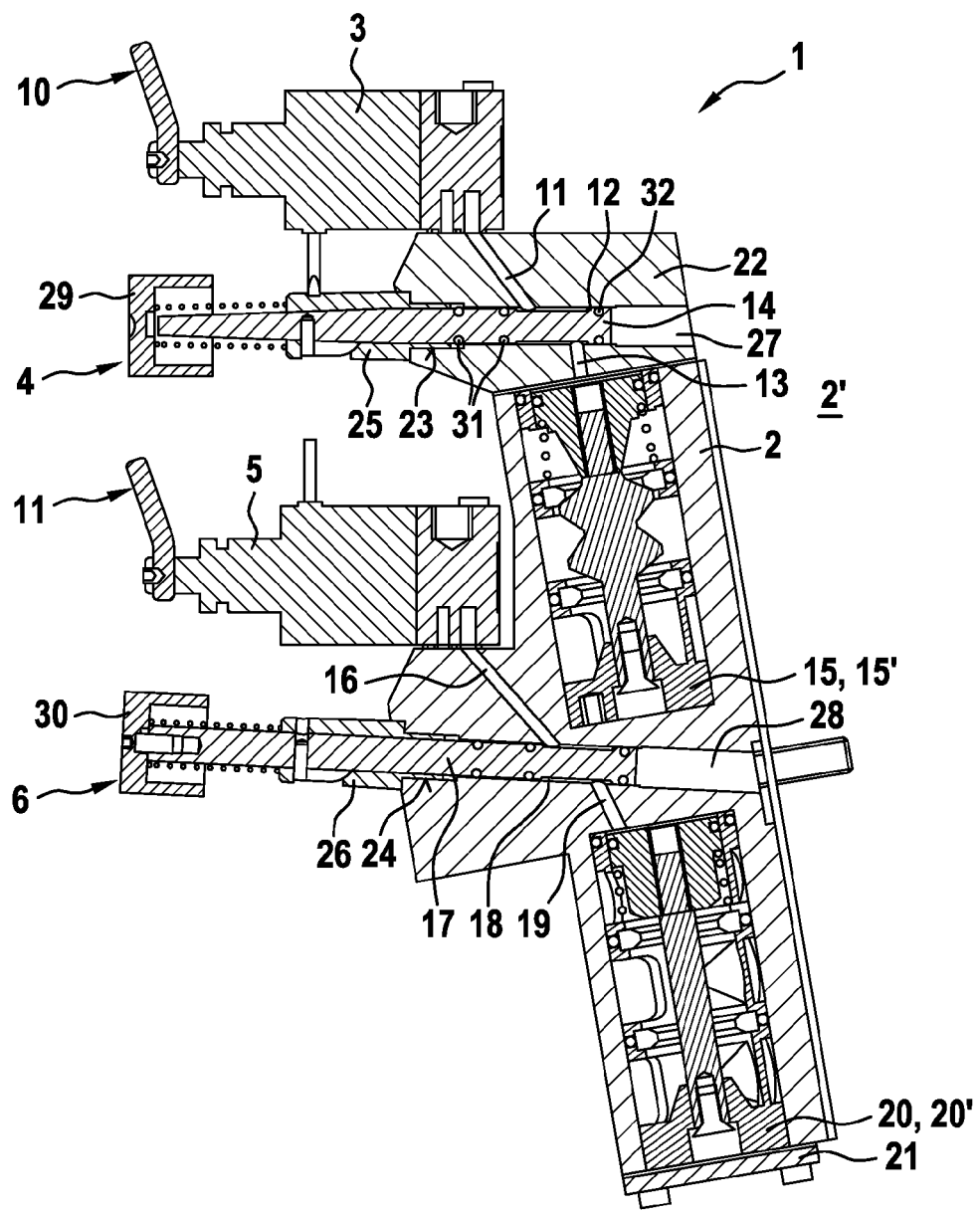
FIG. 2 is a sectional view according to a plane II-II of the valve assembly according to FIG. 1 with open safety valves.
Figure 3:
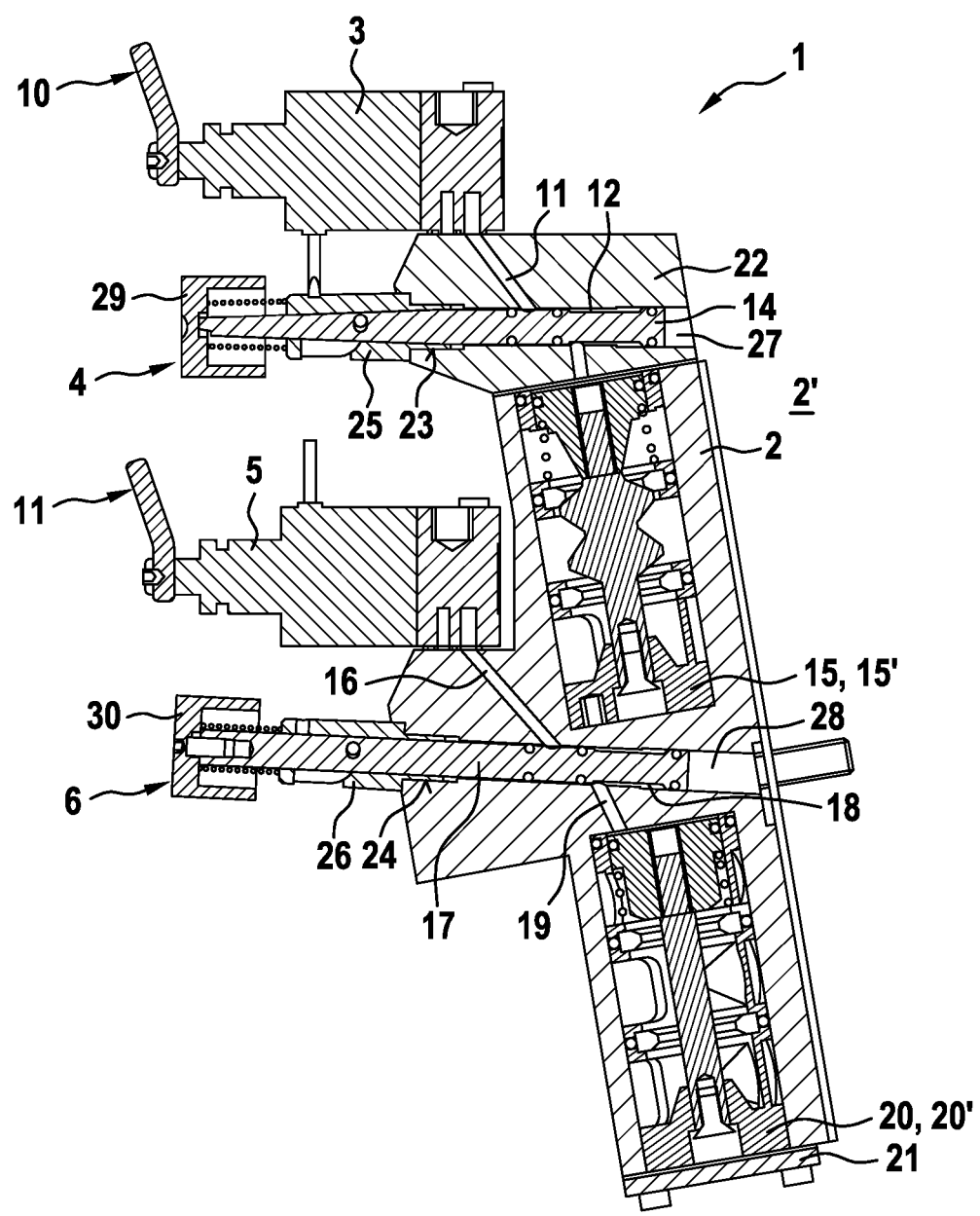
FIG. 3 is a planar view of the valve assembly according to FIG. 2 with closed safety valves.

In the open position of the hand lever 10 shown on FIG. 2, control air passes through a borehole 45 into an annular space 12 enveloping a shank 14 of the safety valve 4, and through another borehole 13 to an upper switching cartridge 15, which forms a switching valve 15' for working air, and can be switched between a position that allows working air outflow and one that blocks the outflow.

In the depicted open position of the hand lever 11, control air in like manner passes through a borehole 16 into an annular space 18 enveloping a shank 17 of the safety valve 6, and through another borehole 19 to a lower switching cartridge 20, which forms a switching valve 20' for working air, and can be switched between a position that allows working air outflow and one that blocks working air outflow.

A cover marked 21 is used to seal the space that accommodates the switching cartridges 15, 20 at its lower end. The borehole 13 runs inside of a head part 22, which seals the upper end of the mentioned space, and carries both the safety valve 4 and pilot control valve 3.

A respective switching cartridge 15, 20 is provided for the opening movement and closing movement of the preform of an IS machine. Basically any unit that encompasses a movable structure for creating the respective open and closed position can be used as the switching cartridge. The two switching valves 15', 20' formed by the switching cartridges 15, 20 are practically always in opposite switching positions, so that opening one switching valve is associated with closing the other switching valve, and vice versa. One respective position of these switching valves 15', 20' is secured by a spring force.

The two safety valves 4, 6 are identical in composition, and consist of a respective guide bushing 25, 26 that is screwed into a borehole 23, 24 of the head part 22 and cartridge carrier 2, and slidably incorporates the respective shank 14, 17. The boreholes inside the head part 22 and cartridge carrier 2 are continued in other coaxially extending boreholes 27, 28.

Located at the ends of the shanks 14, 17 protruding out of the head part 22 and cartridge carrier 2 is a respective button 29, 30, which in conjunction with a spring 46, 47 and a locking mechanism can be locked in the open position depicted on FIG. 2, in which a continuous connection is established between the boreholes 45, 13 or boreholes 16,19 via the annular space 12, 18 of the respective shank 14, 17, and in the closed position, in which this connection is blocked.

Sealing rings marked 31, 32 are used to seal both sides of the mentioned annular space in an axial direction.

A borehole marked 33 continues a borehole 34 of the valve block 7, and serves to supply working air to a movement mechanism and remove working air from the movement mechanism in conjunction with the lower switching cartridge 20 of the valve assembly 1.

A borehole marked 35 is continued in a borehole 36 of the valve block 7, and serves to supply working air to a movement mechanism and remove working air from the movement mechanism in conjunction with the upper switching cartridge 15 of the valve assembly 1.

A borehole inside the valve block 7 marked 37 serves to centrally supply working air to the valve assembly 1, specifically to the lower switching cartridge 20.

A borehole inside the valve block 7 marked 38 serves to centrally supply working air to the valve assembly 1, specifically to the upper switching cartridge 15.

A borehole inside the valve block 7 marked 39 is meant to guide exhaust air of the lower switching cartridge 20.

A borehole inside the valve block 7 marked 40 is meant to guide exhaust air of the upper switching cartridge 15.

Control air is guided through the valve block 7, providing that impacting the one switching valve 15', 20' in the direction toward an open position always causes the other switching valve to be impacted in the direction toward a closed position.

Working air is fed in through a working air duct shared by all valve assemblies 1 of a valve block 7, or alternatively supplied externally to the valve assembly 1.

The safety valves 4, 6 are located in the path guiding the control air between the pilot control valves 3, 5 and the switching valves created by the switching cartridges 15, 20.

The closing cylinder 41 of a preform not graphically depicted is denoted on FIG. 4 solely as an example for a movement mechanism to be actuated by means of the valve assembly 1. Situated therein is a piston 42 connected with the preform halves, one side 43 of which can be impacted via a line hooked up to the borehole 33 (and thus controlled by pilot control valve 5), and the other side 44 of which can be impacted via a line hooked up to the borehole 35 (and thus controlled by pilot control valve 3). The preform can be opened or closed subject to impact via boreholes 33, 35 and the respective pilot control valves 5, 3.

A valve assembly 1 is detachably connected with the valve block 7 as a unit. In order to actuate the movement mechanism by way of the valve assembly 1, the respective pilot control valve 3, 5 is either manually activated by operating the hand lever 10, 11, or electrically activated via a machine controller of the IS machine, so that control air gets to the respectively selected switching valve, which routes working air to the actuated movement mechanism, and thereby triggers its movement. Working air that accrues in the process flows through boreholes in the adapter plate 9, the valve block 7 into a shared exhaust air collector duct via the switching valve.

Actuating the respective safety valves 4, 6 and locking them keeps control air from being supplied to the respective switching valve, thereby preventing a random actuation of the movement mechanism.

Valve assemblies according to the invention make it possible to combine the functions of a pilot control valve carrier, switching valve carrier and safety valve carrier in an easy manner and in particular so as to save on construction volume, and also enable a differentiated, track-by-track interruption of the control air.

REFERENCE LIST

1 Valve assembly
2 Cartridge carrier
2' Valve carrier
3 Pilot control valve
4 Safety valve
5 Pilot control valve
6 Safety valve
7 Valve block
8 Machine frame
9 Adapter plate
10 Hand lever
11 Hand level
12 Annular space
13 Borehole
14 Shank
15 Switching cartridge
15' Switching valve
16 Borehole
17 Shank
18 Annular space
19 Borehole
20 Switching cartridge
20' Switching valve
21 Cover
22 Head part
23 Borehole
24 Borehole
25 Guide bushing
26 Guide bushing
27 Borehole
28 Borehole
29 Button
30 Button
31 Sealing ring
32 Sealing ring
33 Borehole
34 Borehole
35 Borehole
36 Borehole
37 Borehole
38 Borehole
39 Borehole
40 Borehole
41 Closing cylinder
42 Piston
43 Side
44 Side
45 Borehole
46 Spring
47 Spring

The invention claimed is:

1. A valve assembly for controlling at least one movement mechanism of a machine, comprising:
a valve carrier allocated to said one movement mechanism;
at least one pilot control valve for controlling a flow of control air, said pilot control valve being allocated to said one movement mechanism and modularly attached to said valve carrier;
at least one switching valve for controlling working air for said one movement mechanism, said switching valve configured to be operated by said control air from said pilot control valve, said switching valve being allocated to said one movement mechanism and modularly attached to said valve carrier;
at least one safety valve arranged in a flow path of the control air between the pilot control valve and the switching valve, said safety valve having a shank arranged in a borehole of the valve carrier to be axially slidable between a position representing an open position whereby said control air can flow to said switching valve and a closed position whereby said control air is blocked from flowing to said switching valve;
wherein a respective said switching valve of said valve carrier is allocated to each opening and closing movement of said one movement mechanism of the machine, and a respective switching position of one of said open and closed positions of each of the respective switching valves is secured by a spring force.

2. The valve assembly according to claim 1, wherein the valve carrier includes interfaces for the supply of control and working air.

3. The valve assembly according to claim 1, wherein the pilot control valve is optionally configured to be manually or electrically controllable.

4. The valve assembly according to claim 1, wherein each said switching valve is formed by a replaceable switching cartridge arranged inside of the valve carrier.

5. The valve assembly according to claim 1, wherein at least the open or closed position of a said safety valve can be locked.

6. The valve assembly according to claim 4, wherein said valve carrier includes a cartridge carrier that has a cylindrical space configured to accommodate two switching valves and is sealed at its one end by a cover and at its other end by a head part.

7. The valve assembly according to claim 6, wherein the head part forms a carrier both for said pilot control valve and for said safety valve.

8. The valve assembly according to claim 1, wherein the respective open and closed positions of the safety valve are secured by a spring force.

9. The valve assembly according to claim 1, wherein the pilot control valve is detachably connected to the valve carrier.

10. The valve assembly according to claim 1, wherein the safety valve is detachably connected to the valve carrier.

11. The valve assembly according to claim 2, wherein the pilot control valve is optionally configured to be manually or electrically controllable.

12. The valve assembly according to claim 2, wherein each switching valve is formed by a replaceable switching cartridge arranged inside of the valve carrier.

13. The valve assembly according to claim 2, wherein at least the open or closed position of said safety valve can be locked.

14. The valve assembly according to claim 5, wherein said valve carrier includes a cartridge carrier that has a cylindrical space configured to accommodate two switching valves and is sealed at its one end by a cover and at its other end by a head part.

15. The valve assembly (1) according to claim 2, wherein the respective open and closed positions of the safety valve are secured by a spring force.

16. The valve assembly according to claim 2, wherein the pilot control valve is detachably connected to the valve carrier.

17. The valve assembly according to claim 2, wherein the safety valve is detachably connected to the valve carrier.

18. The valve assembly according to claim 1 wherein said shank includes a button for actuating said safety valve.

19. The valve assembly according to claim 3, wherein the valve carrier includes interfaces for the supply of control and working air.

20. The valve assembly according to claim 4, wherein the pivot control valve is optionally configured to be manually or electrically controllable.

21. The valve assembly according to claim 4, wherein the valve carrier includes interfaces for the supply of control and working air.

22. The valve assembly according to claim 6, wherein at least the open or closed position of said safety valve can be locked.

* * * * *